US012801622B2

(12) United States Patent
Fruman et al.

(10) Patent No.: US 12,801,622 B2
(45) Date of Patent: Nov. 17, 2026

(54) INTEGRATION OF DATA SOURCES WITH DATABASE TABLES

(71) Applicant: ServiceNow, Inc., Santa Clara, CA (US)

(72) Inventors: Alex Fruman, Petah Tikva (IL); Noy Shpatz, Petah Tikva (IL); Abd El Rahman Massarwa, Petah Tikva (IL); Michael Zonen, Petah Tikva (IL); Yosef Haim David Shani, Petah Tikva (IL); Chen Ezra, Petah Tikva (IL); Maayan Wigelman, Petah Tikva (IL); Bnayahu Makovsky, Petah Tikva (IL); Naga Maheswara Reddy Palem, Hyderabad (IN); Alankar Vishnoi, Hyderabad (IN); Vikas Swami, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 78 days.

(21) Appl. No.: 18/790,673

(22) Filed: Jul. 31, 2024

(65) Prior Publication Data

US 2025/0053573 A1 Feb. 13, 2025

Related U.S. Application Data

(60) Provisional application No. 63/531,911, filed on Aug. 10, 2023.

(51) Int. Cl.
*G06F 16/25* (2019.01)
*G06F 16/242* (2019.01)
*G06F 40/284* (2020.01)

(52) U.S. Cl.
CPC ........ *G06F 16/258* (2019.01); *G06F 16/2423* (2019.01); *G06F 40/284* (2020.01)

(58) Field of Classification Search
CPC ............... G06F 16/258; G06F 16/2423; G06F 40/284
See application file for complete search history.

(56) References Cited

U.S. PATENT DOCUMENTS 4,941,084 A 7/1990 Terada et al.
5,185,860 A 2/1993 Wu
(Continued)

FOREIGN PATENT DOCUMENTS

EP 0433979 A2 6/1991
EP 1607824 A2 12/2005
(Continued)

OTHER PUBLICATIONS

Fathy, Y. (2020). Large-scale indexing, discovery and ranking for the internet of things (IoT). [University of Surrey]. https://doi.org/10.15126/thesis.00848997.*
(Continued)

*Primary Examiner* — Matthew J Ellis
(74) *Attorney, Agent, or Firm* — McDonnell Boehnen Hulbert & Berghoff LLP

(57) ABSTRACT

An example may involve obtaining structured data that is characterized by a notification format; processing the structured data to determine a mapping between one or more fields of the notification format and one or more fields of a database schema, wherein the database schema is characterized by a database format; translating a notification from the notification format into the database schema according to the mapping; and storing the translated notification into a database that operates according to the database schema.

20 Claims, 15 Drawing Sheets

(56) References Cited

U.S. PATENT DOCUMENTS

| | | | |
|---|---|---|---|
| 5,237,518 A | 8/1993 | Sztipanovits et al. | |
| 5,261,097 A | 11/1993 | Saxon | |
| 5,265,252 A | 11/1993 | Rawson, III et al. | |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A | 9/1997 | Christiano | |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,166,732 A | 12/2000 | Mitchell et al. | |
| 6,167,448 A | 12/2000 | Hemphill et al. | |
| 6,175,866 B1 | 1/2001 | Holloway et al. | |
| 6,175,878 B1 | 1/2001 | Seaman et al. | |
| 6,260,050 B1 | 7/2001 | Yost et al. | |
| 6,263,457 B1 | 7/2001 | Anderson et al. | |
| 6,272,150 B1 | 8/2001 | Hrastar et al. | |
| 6,336,138 B1 | 1/2002 | Caswell et al. | |
| 6,363,421 B2 | 3/2002 | Barker et al. | |
| 6,393,386 B1 | 5/2002 | Zager et al. | |
| 6,397,245 B1 | 5/2002 | Johnson, II et al. | |
| 6,434,626 B1 | 8/2002 | Prakash et al. | |
| 6,438,592 B1 | 8/2002 | Killian | |
| 6,456,306 B1 | 9/2002 | Chin et al. | |
| 6,466,932 B1 | 10/2002 | Dennis et al. | |
| 6,487,590 B1 | 11/2002 | Foley et al. | |
| 6,505,248 B1 | 1/2003 | Casper et al. | |
| 6,526,442 B1 | 2/2003 | Stupek, Jr. et al. | |
| 6,621,823 B1 | 9/2003 | Mellquist et al. | |
| 6,707,795 B1 | 3/2004 | Noorhosseini et al. | |
| 6,742,015 B1 | 5/2004 | Bowman-Amuah | |
| 6,763,380 B1 | 7/2004 | Mayton et al. | |
| 6,816,898 B1 | 11/2004 | Scarpelli et al. | |
| 6,895,586 B1 | 5/2005 | Brasher et al. | |
| 6,948,175 B1 | 9/2005 | Fong et al. | |
| 6,985,901 B1 | 1/2006 | Sachse et al. | |
| 7,003,564 B2 | 2/2006 | Greuel et al. | |
| 7,028,228 B1 | 4/2006 | Lovy et al. | |
| 7,043,537 B1 | 5/2006 | Pratt | |
| 7,043,661 B2 | 5/2006 | Valadarsky et al. | |
| 7,062,683 B2 | 6/2006 | Warpenburg et al. | |
| 7,096,459 B2 | 8/2006 | Keller et al. | |
| 7,146,574 B2 | 12/2006 | Goldthwaite et al. | |
| 7,197,466 B1 | 3/2007 | Peterson et al. | |
| 7,215,360 B2 | 5/2007 | Gupta | |
| 7,216,304 B1 | 5/2007 | Gourdol et al. | |
| 7,222,147 B1 | 5/2007 | Black et al. | |
| 7,281,170 B2 | 10/2007 | Taylor et al. | |
| 7,328,260 B1 | 2/2008 | Muthiyan et al. | |
| 7,412,502 B2 | 8/2008 | Fearn et al. | |
| 7,505,872 B2 | 3/2009 | Keller et al. | |
| 7,593,013 B2 | 9/2009 | Agutter et al. | |
| 7,596,716 B2 | 9/2009 | Frost et al. | |
| 7,617,073 B2 | 11/2009 | Trinon et al. | |
| 7,660,731 B2 | 2/2010 | Chaddha et al. | |
| 7,676,294 B2 | 3/2010 | Baier et al. | |
| 7,676,437 B2 | 3/2010 | Satkunanathan et al. | |
| 7,840,490 B1 | 11/2010 | Sellers et al. | |
| 7,877,783 B1 | 1/2011 | Cline et al. | |
| 7,890,869 B1 | 2/2011 | Mayer et al. | |
| 7,966,398 B2 | 6/2011 | Wiles, Jr. | |
| 8,060,396 B1 | 11/2011 | Bessler et al. | |
| 8,196,210 B2 | 6/2012 | Sterin | |
| 8,321,948 B2 | 11/2012 | Robinson et al. | |
| 8,407,669 B2 | 3/2013 | Yee et al. | |
| 8,554,750 B2 | 10/2013 | Rangarajan et al. | |
| 8,595,647 B2 | 11/2013 | Sabin et al. | |
| 8,620,818 B2 | 12/2013 | Hughes et al. | |
| 8,646,093 B2 | 2/2014 | Myers et al. | |
| 8,674,992 B2 | 3/2014 | Poston et al. | |
| 8,725,647 B2 | 5/2014 | Disciascio et al. | |
| 9,053,460 B2 | 6/2015 | Gilbert et al. | |
| 9,069,737 B1 | 6/2015 | Kimotho et al. | |
| 9,654,567 B2 | 5/2017 | Dubois | |
| 9,971,826 B1 | 5/2018 | Belmar | |
| 10,023,117 B2 | 7/2018 | Ricci | |
| 10,346,142 B1 | 7/2019 | Cavalier | |
| 10,673,963 B1 | 6/2020 | Feiguine et al. | |
| 10,747,592 B2 | 8/2020 | Kolodzieski | |
| 10,749,943 B1 | 8/2020 | Feiguine et al. | |
| 10,771,344 B2 | 9/2020 | Bitterfeld et al. | |
| 10,824,650 B2 | 11/2020 | Bar Oz et al. | |
| 10,944,654 B2 | 3/2021 | Rimar et al. | |
| 10,999,152 B1 | 5/2021 | Bar Oz et al. | |
| 11,025,481 B1 | 6/2021 | Louca et al. | |
| 11,089,115 B2 | 8/2021 | Garty et al. | |
| 11,095,506 B1 | 8/2021 | Erblat et al. | |
| 11,226,941 B2 * | 1/2022 | Krause | G06F 16/213 |
| 11,275,580 B2 | 3/2022 | Tamir et al. | |
| 11,277,475 B1 | 3/2022 | Tal et al. | |
| 11,281,442 B1 | 3/2022 | Tal et al. | |
| 11,294,666 B1 | 4/2022 | Look | |
| 11,296,922 B2 | 4/2022 | Leibkowiz et al. | |
| 11,301,503 B2 | 4/2022 | Burli | |
| 11,379,089 B2 | 7/2022 | Goswami et al. | |
| 11,451,573 B2 | 9/2022 | Waplington | |
| 11,470,107 B2 | 10/2022 | Waplington | |
| 11,500,826 B2 * | 11/2022 | Maurya | G06F 16/211 |
| 11,582,106 B2 | 2/2023 | Hameiri et al. | |
| 11,616,690 B2 | 3/2023 | Feiguine et al. | |
| 11,630,717 B2 | 4/2023 | Vutukuru et al. | |
| 11,632,303 B2 | 4/2023 | Bitterfeld et al. | |
| 11,640,369 B2 | 5/2023 | Bhogle et al. | |
| 11,671,444 B2 | 6/2023 | Waplington | |
| 11,695,641 B2 | 7/2023 | Bar Oz et al. | |
| 11,791,914 B2 | 10/2023 | Cella | |
| 11,829,233 B2 | 11/2023 | Watkins et al. | |
| 11,868,593 B2 | 1/2024 | Bradley et al. | |
| 2002/0116340 A1 | 8/2002 | Hellberg et al. | |
| 2002/0133584 A1 | 9/2002 | Greuel et al. | |
| 2002/0158969 A1 | 10/2002 | Gupta | |
| 2003/0118087 A1 | 6/2003 | Goldthwaite et al. | |
| 2003/0200293 A1 | 10/2003 | Fearn et al. | |
| 2005/0015217 A1 | 1/2005 | Weidl et al. | |
| 2005/0091356 A1 | 4/2005 | Izzo | |
| 2006/0026453 A1 | 2/2006 | Frost et al. | |
| 2006/0095461 A1 | 5/2006 | Raymond | |
| 2006/0179058 A1 | 8/2006 | Bram et al. | |
| 2006/0288053 A1 | 12/2006 | Holt et al. | |
| 2006/0293942 A1 | 12/2006 | Chaddha et al. | |
| 2007/0033279 A1 | 2/2007 | Battat et al. | |
| 2007/0100960 A1 * | 5/2007 | Eichstaedt | H04L 67/101 709/217 |
| 2007/0188494 A1 | 8/2007 | Agutter et al. | |
| 2007/0288389 A1 | 12/2007 | Vaughan et al. | |
| 2008/0133289 A1 | 6/2008 | Armour et al. | |
| 2008/0148253 A1 | 6/2008 | Badwe et al. | |
| 2008/0319779 A1 | 12/2008 | Hughes et al. | |
| 2009/0088875 A1 | 4/2009 | Baier et al. | |
| 2009/0228984 A1 | 9/2009 | Sterin | |
| 2010/0110932 A1 | 5/2010 | Doran et al. | |
| 2012/0047425 A1 * | 2/2012 | Ahmed | G06F 40/174 715/234 |

(56) References Cited

U.S. PATENT DOCUMENTS

| | | | |
|---|---|---|---|
| 2013/0283273 | A1 | 10/2013 | Miyazaki |
| 2014/0122427 | A1 | 5/2014 | Dary |
| 2017/0118240 | A1* | 4/2017 | Devi Reddy .......... G06N 20/00 |
| 2017/0345277 | A1* | 11/2017 | Kurniawan ......... H04L 12/2825 |
| 2018/0123940 | A1 | 5/2018 | Rimar et al. |
| 2019/0073257 | A1 | 3/2019 | Dasgupta et al. |
| 2019/0104398 | A1 | 4/2019 | Owen et al. |
| 2019/0129739 | A1 | 5/2019 | Al Reza et al. |
| 2019/0149515 | A1 | 5/2019 | Sharma et al. |
| 2019/0165957 | A1 | 5/2019 | Abbott et al. |
| 2019/0342162 | A1 | 11/2019 | Bendre et al. |
| 2020/0034462 | A1 | 1/2020 | Narayanasamy et al. |
| 2020/0050689 | A1 | 2/2020 | Tal et al. |
| 2020/0204443 | A1 | 6/2020 | Bar Oz et al. |
| 2020/0235986 | A1* | 7/2020 | Embarmannar Vijayan ................ H04L 41/22 |
| 2020/0301678 | A1 | 9/2020 | Burman et al. |
| 2021/0097168 | A1* | 4/2021 | Patel ..................... G06F 21/554 |
| 2021/0141774 | A1* | 5/2021 | Dhaygude ............. G06F 16/212 |
| 2021/0168105 | A1* | 6/2021 | Liebherr ................. H04L 51/08 |
| 2021/0194764 | A1 | 6/2021 | Badyan et al. |
| 2022/0303352 | A1 | 9/2022 | Herzog et al. |
| 2023/0032005 | A1* | 2/2023 | Marin ..................... G06F 16/93 |
| 2023/0113558 | A1* | 4/2023 | Johnson .............. G06F 16/2246 707/803 |
| 2023/0229542 | A1 | 7/2023 | Watkins et al. |
| 2023/0316186 | A1* | 10/2023 | Miller .............. G06Q 10/06315 |

FOREIGN PATENT DOCUMENTS

| | | | |
|---|---|---|---|
| WO | 9934285 | W | 7/1999 |
| WO | 0052559 | W | 9/2000 |
| WO | 0179970 | W | 10/2001 |

OTHER PUBLICATIONS

Raj et al., 2018, “MongoDB as an Efficient Graph Database: An Application of Document Oriented NOSQL Database” (Year: 2018).*

Servicenow, Utah IT Operations Management, Jul. 17, 2023.

* cited by examiner

JSON FILE 700

```
{
  "Person": {
    "First Name": "John",
    "Last Name": "Doe",
    "Age": 30,
    "Education": {
      "College": {
        "Name": "State U",
        "State": "North Dakota"
      },
      "Degree": "BA"
    },
    "Location": {
      "City": "Chicago",
      "State": "IL"
    },
    "Phone": [
      "123 456-7899",
      "998 765-4321"
    ]
  }
}
```

PATH STRUCTURE 702

```
"$.Person"
"$.Person.First Name"
"$.Person.Last Name"
"$.Person.Age"
"$.Person.Education"
"$.Person.Education.College"
"$.Person.Education.College.Name"
"$.Person.Education.College.State"

"$.Person.Education.Degree"

"$.Person.Location"
"$.Person.Location.City"
"$.Person.Location.State"

"$.Person.Phone"
"$.Person.Phone.[0]"
"$.Person.Phone.[1]"
```

XML FILE 704

```
<?xml version="1.0" encoding="UTF-8" ?>
<Person>
    <First Name>John</First Name>
    <Last Name>Doe</Last Name>
    <Age>30</Age>
    <Education>
        <College>
            <Name>State U</Name>
            <State>North Dakota</State>
        </College>
        <Degree>BA</Degree>
    </Education>
    <Location>
        <City>Chicago</City>
        <State>IL</State>
    </Location>

    <Phone>123 456-7899</Phone>
    <Phone>998 765-4321</Phone>
</Person>
```

FIG. 7

INTEGRATION OF DATA SOURCES WITH DATABASE TABLES

CROSS-REFERENCE TO RELATED APPLICATION

This application claims priority to U.S. provisional patent application No. 63/531,911, filed Aug. 10, 2023, which is hereby incorporated by reference in its entirety.

BACKGROUND

It is advantageous for computing platforms to be able to receive notifications (e.g., events, updates to logs, updates to metrics, and so on) from remote systems, and to store these notifications in accordance with a pre-defined database schema. However, different systems may provide events in different notification formats. Mapping between the notification format from a third-party and the computing platform's database schema is a challenging process that includes an extensive knowledge of both formats. This makes integrations of such notifications into the computing platform time intensive and error prone, resulting in operational errors and incorrect classifications of notifications. The result of this is wastage of computing resources (e.g., processing, memory, and/or network bandwidth) as users are forced to load numerous web pages and/or application pages in order to sort through incorrect data when seeking notification information.

SUMMARY

Various implementations disclosed herein include user interfaces that allow the specification of a third-party notification format in structured markup language. From this, a computing platform applies rules to automatically map fields within the structured markup language to corresponding fields in its database schema. A user has the ability to modify this mapping for purposes of correction or customization. Once the mapping is finalized and activated, notifications received from the remote systems can be ingested into the computing platform's database. Advantageously, this approach significantly simplifies the process of defining the mapping, making it usable by non-experts. Further, the various third-party notification formats are unified into the computing platform's pre-defined database schema, making such notifications easier to understand and process. Moreover, usage of computing resources (e.g., processing, memory, and/or network bandwidth) is reduced due to users having to navigate unnecessarily through a large number of web pages and/or application pages before being able to find the information needed.

Accordingly, a first example embodiment may involve obtaining structured data that is characterized by a notification format; processing the structured data to determine a mapping between one or more fields of the notification format and one or more fields of a database schema, wherein the database schema is characterized by a database format; translating a notification from the notification format into the database schema according to the mapping; and storing the translated notification into a database that operates according to the database schema.

A second example embodiment may involve a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7 depicts examples of JSON file path structures, in accordance with example embodiments.

DETAILED DESCRIPTION

Figure 1:
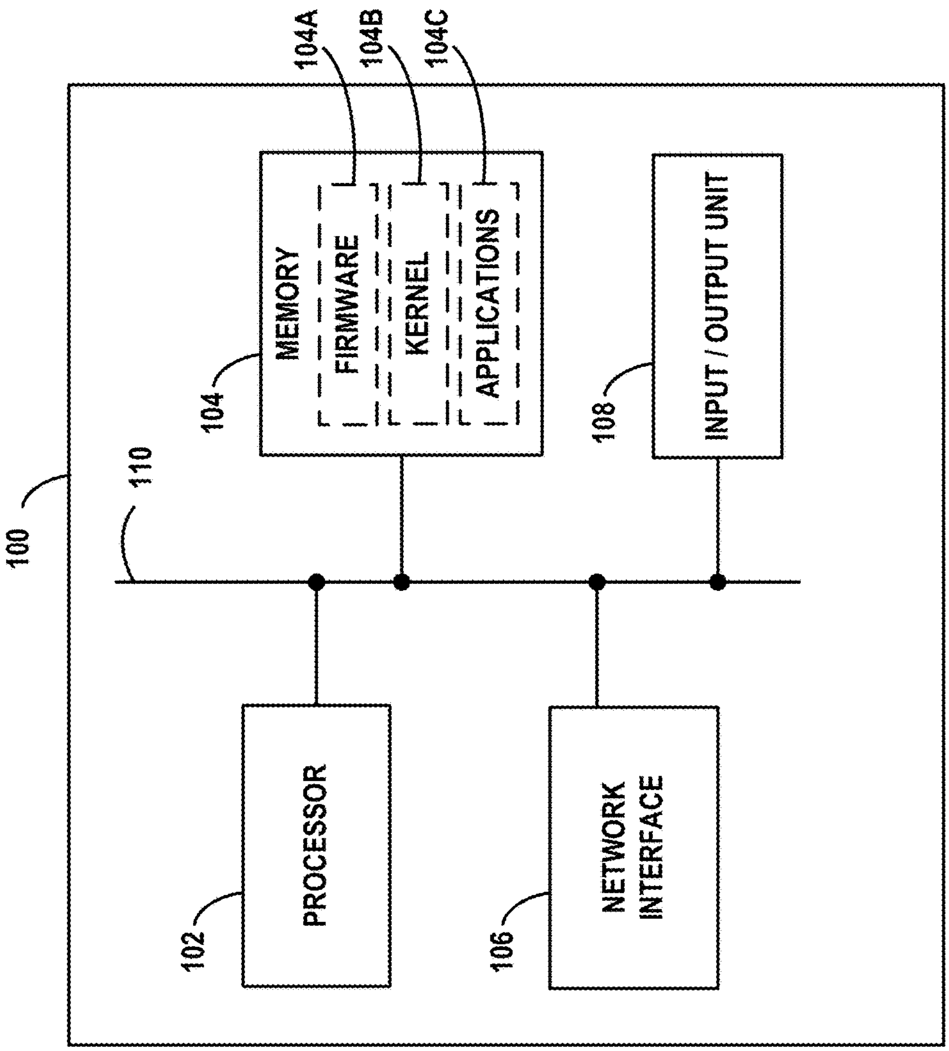
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Example Technical Improvements

These embodiments provide a technical solution to a technical problem. One technical problem being solved is determining a mapping between the paths or fields of incoming notifications and those a database schema.

In other examples, these mappings either did not occur (resulting in notification data remaining in disparate formats), or occurred based on ad hoc procedures. However, these techniques do not scale. Moreover, these other examples rely on subjective decisions and experiences of users providing the mappings, which leads to wildly varying outcomes from instance to instance as well as operational errors and incorrect classifications of notifications. Thus, previous techniques did little if anything to address consistently representing notification data in a common format. Furthermore, previous techniques resulted in wastage of computing resources (e.g., processing, memory, and/or network bandwidth) as users were forced to load numerous web pages and/or application pages in order to sort through incorrect data when seeking notification information.

The embodiments herein overcome these limitations by automatically placing incoming notifications in a structured data format (e.g., JSON, XML, etc.). In this manner, mappings between different formats of these notifications can be determined in a more accurate and robust fashion. This results in several advantages. First, notifications from various sources can be transformed into a common format or structure, ensuring consistency and compatibility for subsequent processing. Second, notifications can be augmented with additional contextual information from external sources or internal databases (e.g., tags), making them more valuable for event analysis and correlation. Third, the automated mappings can be generated quickly and accurately. Further, usage of computing resources (e.g., processing, memory, and/or network bandwidth) is reduced due to users having to navigate unnecessarily through a large number of web pages and/or application pages before being able to find the information needed.

Other technical improvements may also flow from these embodiments, and other technical problems may be solved. Thus, this statement of technical improvements is not limiting and instead constitutes examples of advantages that can be realized from the embodiments.

II. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

III. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
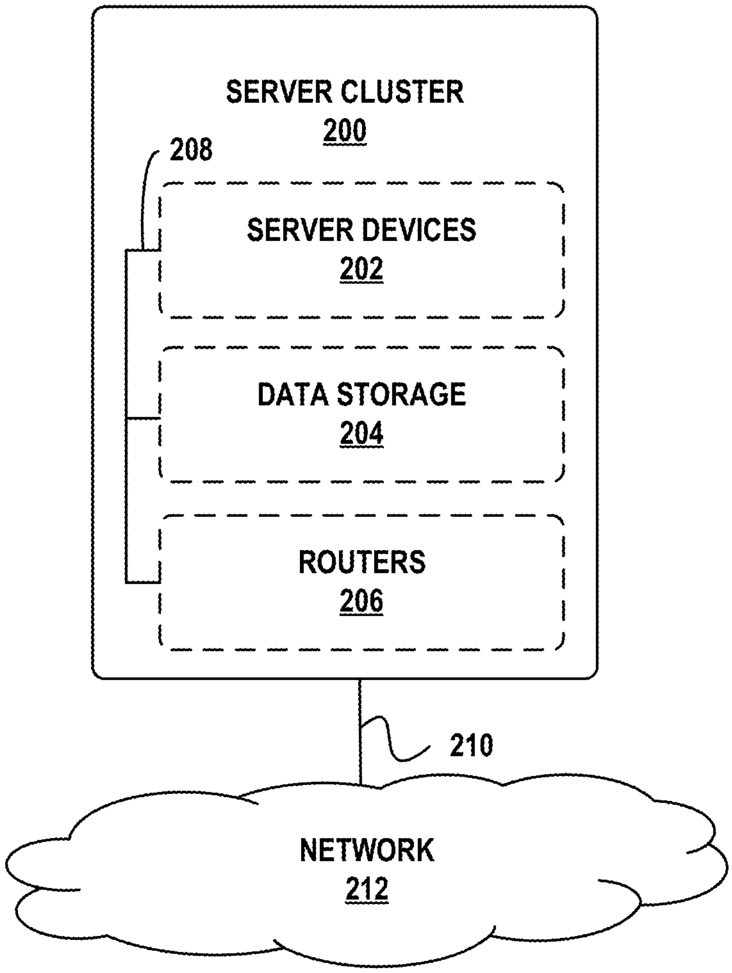
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

IV. Example Remote Network Management Architecture

Figure 3:
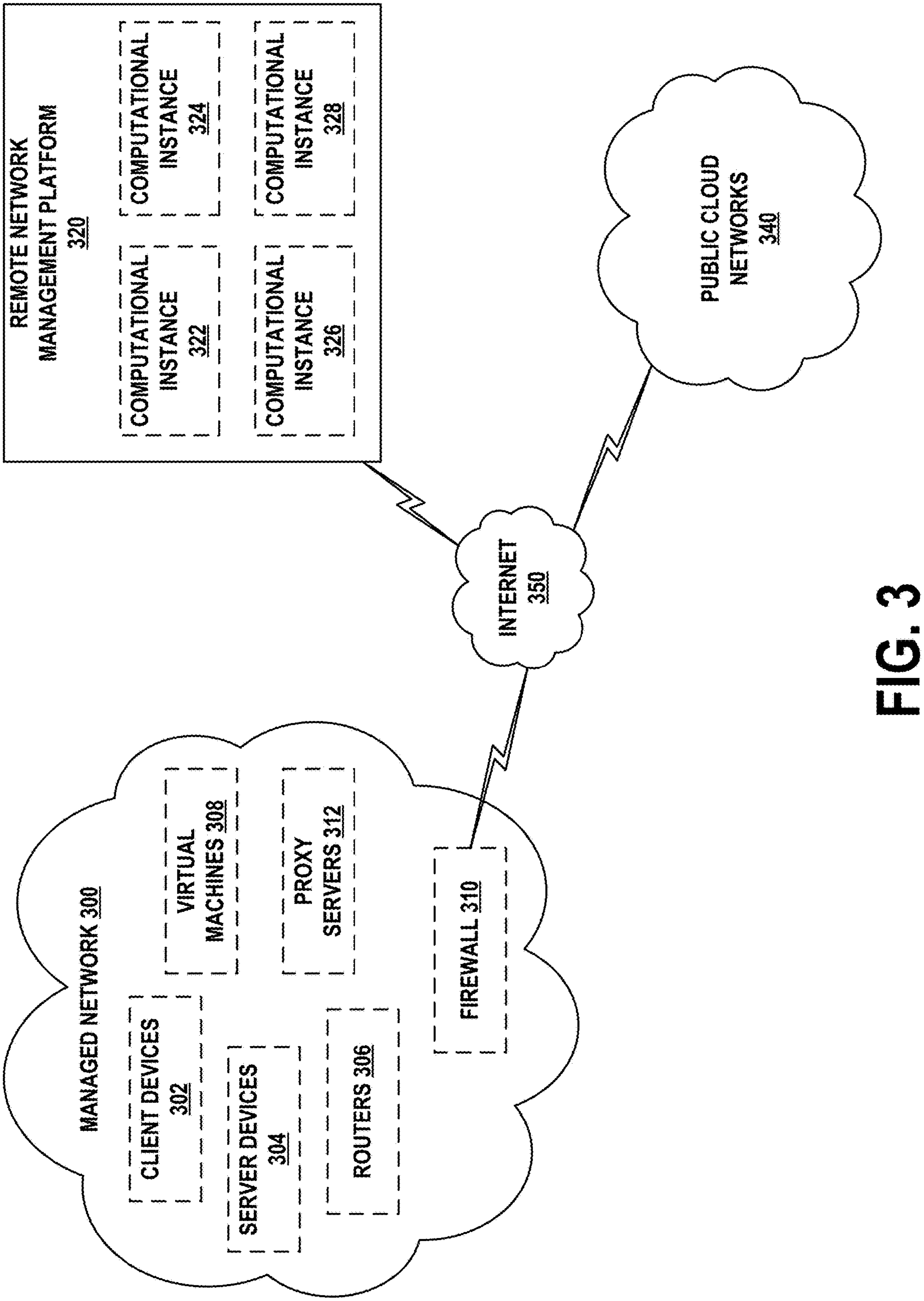
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include Amazon AWS Cloud, Microsoft Azure Cloud (Azure), Google Cloud Platform (GCP), and IBM Cloud Platform. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
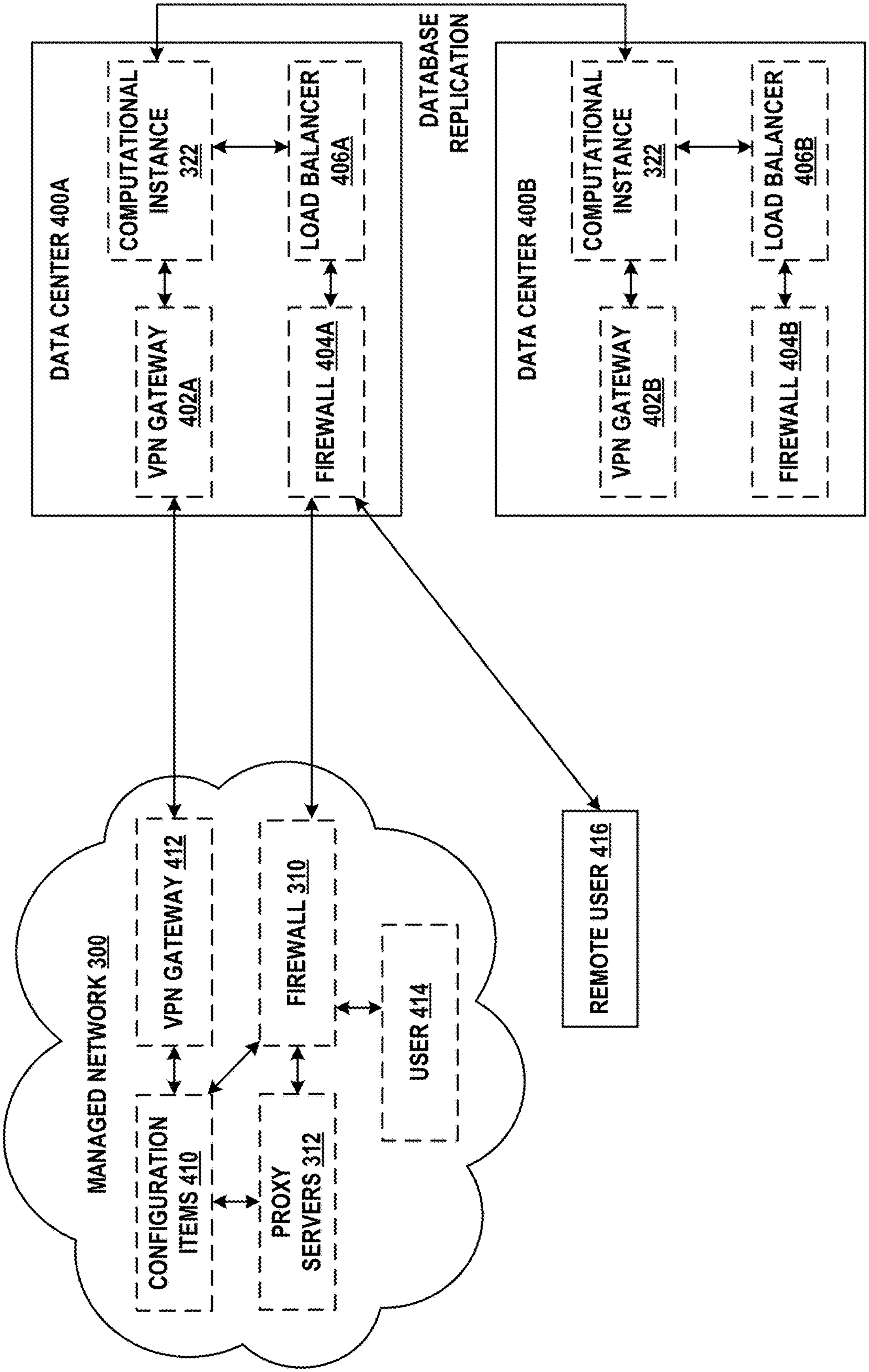
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

V. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
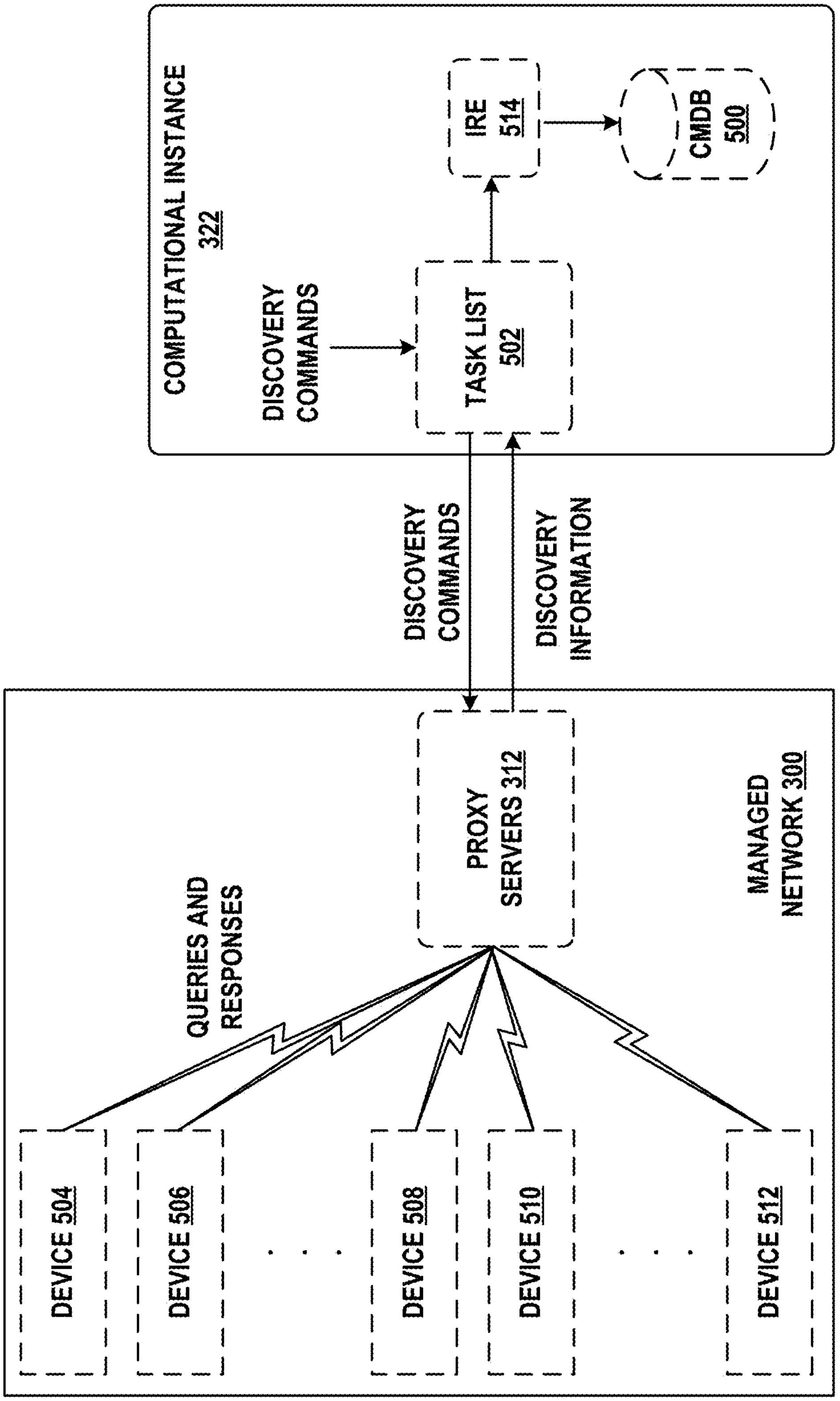
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery-horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

VI. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VII. Example Structured Markup Language

As noted above, the embodiments herein relate to increasing the efficiency of integrating notifications received in various structured data formats into a remote network management platform. JavaScript Object Notation (JSON), an example of such a format, is used herein for purpose of illustration. Nonetheless, the embodiments herein may be used with other types of formats as well (e.g., XML or HTML). JSON is commonly used to format textual information that is communicated between a web client and web server, such as in representational state transfer (REST) transactions. But JSON can also be used for inter-application communication in general, between applications on the same computing device and/or between two or more computing devices. In the examples herein, it is assumed that JSON is used to encode notifications transmitted by a third-party system to a computational instance of a remote network management platform.

JSON supports recursive hierarchical nesting of objects and arrays. A JSON object is an unordered set of key-value pair elements that begins with a left brace ("{") and ends with a right brace ("}"). Each key-value pair element in an object is separated by a comma. JSON arrays are ordered sets of value textually-represented elements that begin with a left bracket ("[") and end with a right bracket ("]"). The value elements in an array are separated by commas. Value elements may be character strings, numbers, Boolean values, or null values, as well as objects or arrays (thus enabling the recursive hierarchical nesting). The key part of a key-value pair element is also a text string. Any amount of whitespace can be placed between these items.

Figure 6:
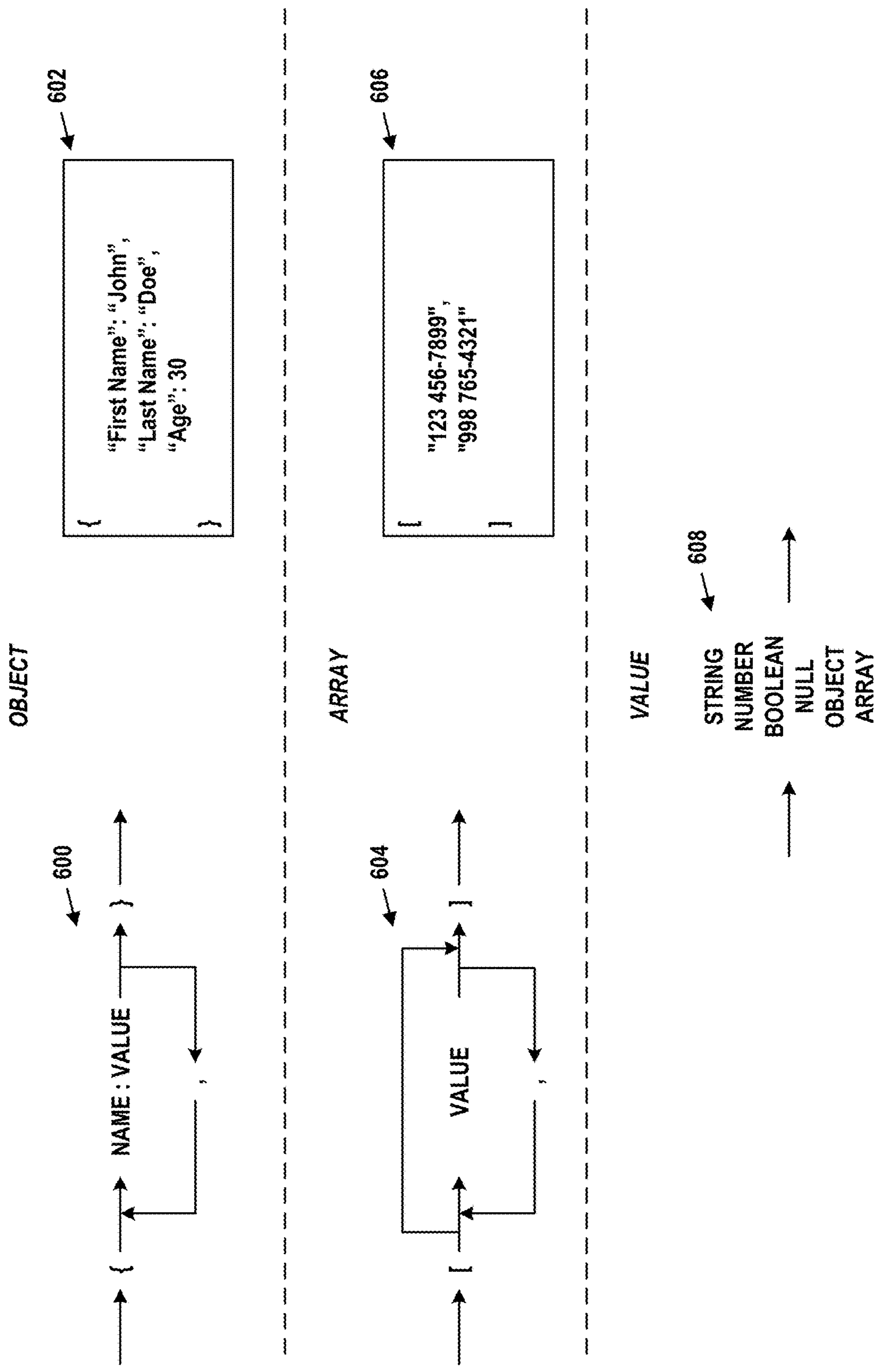
FIG. 6 depicts a JavaScript Object Notation (JSON) format, in accordance with example embodiments.

FIG. 6 depicts formal language definitions and associated examples of JSON. Diagram 600 provides a formal definition of an object, diagram 604 provides a formal definition of an array, and diagram 608 provides a formal definition of a value element. Example 602 is of an object containing three key-value pair elements for the first name, last name, and age, respectively, of an individual. Example 606 is of an array containing two value elements for phone numbers. Both of these examples are fully encapsulated by braces and brackets, respectively. Thus, they are completely defined and may be referred to as records. In other words, records in JSON representations are delimited by an open brace and a corresponding close brace, or an open bracket and a corresponding close bracket. Objects, arrays, values, and/or any combination thereof may be referred to as elements.

Elements within a record can be uniquely identified by a path. The path may be represented as a concatenation of the nested objects and arrays that can be used to locate a specific element within the JSON file. For instance, in FIG. 7, JSON file 700 defines a "Person" object with various nested objects and arrays. Path structure 702 defines the corresponding paths for each, object, array, and value in JSON file 700. For instance, the person's first name ("John") can be found at "$.Person.First Name", the person's age (30) can be found at "$.Person.Age" and the person's degree ("BA") can be found at "$.Person.Education.Degree". In this syntax, a path always begins with "$." and element names (keys) are separated by a ".". Further, arrays are indexed in brackets surrounding numbering that begins at 0 (e.g., "$.Person.Phone.[0]" and "$.Person.Phone.[1]").

For sake of illustration, FIG. 7 also includes XML file 704, which is functionally equivalent to JSON file 700, and when parsed would also result in path structure 702. XML file 704 demonstrates that the embodiments herein can operate equally well on XML even though JSON is used for purposes of example.

VIII. Integration of Third-Party Notifications

Figure 8:
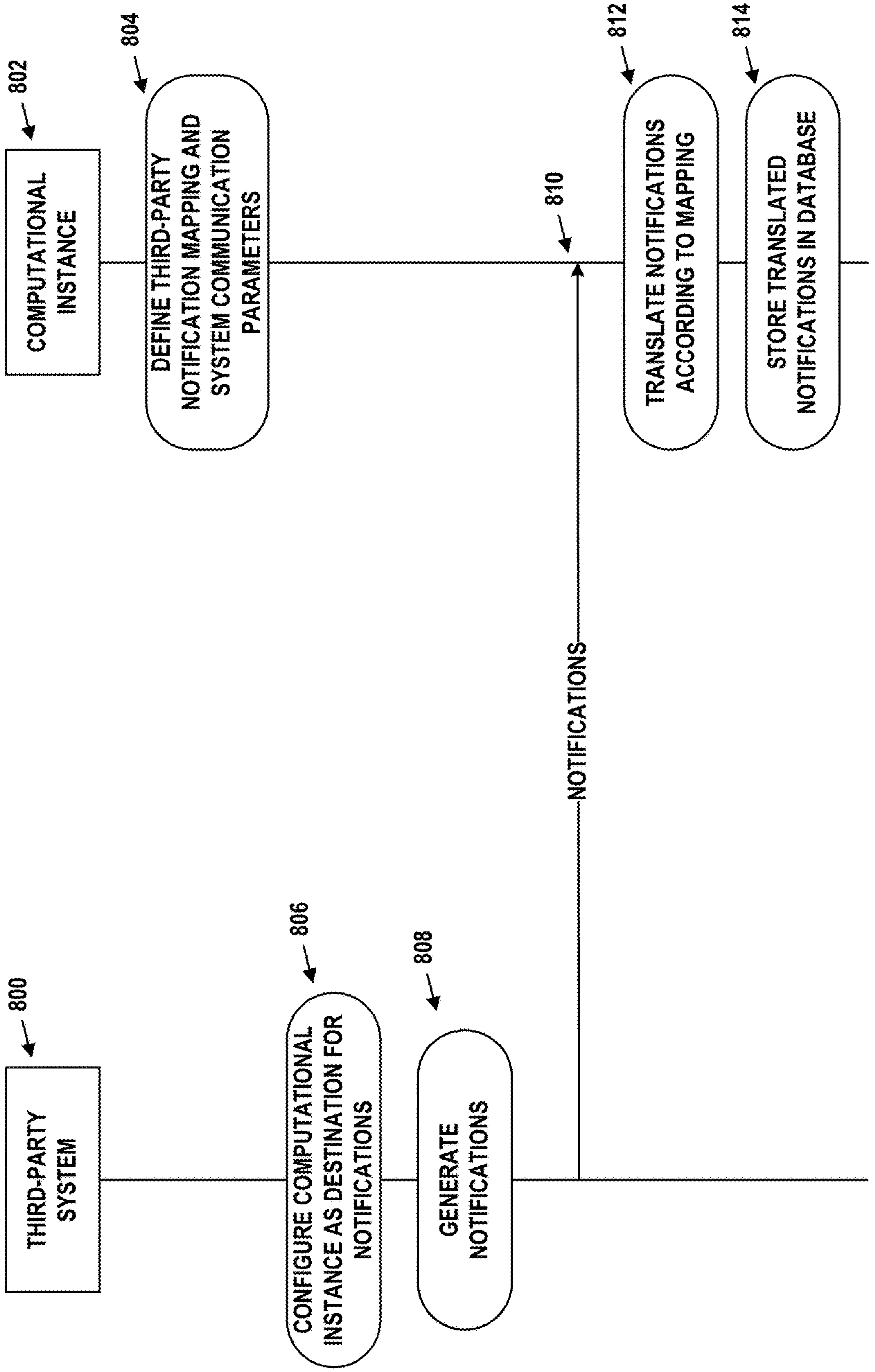
FIG. 8 is a message flow diagram, in accordance with example embodiments.

The implementations herein facilitate simplified integration of notifications from various third-party systems into a computational instance of a remote network management platform. An overview of such an integration is shown in FIG. 8.

Third-party system 800 represents one or more computing devices that can generate various types of notifications. Computational instance 802 represents such an instance as supported by remote network management platform 320, for example.

Herein, the term "third-party" may refer to any computing devices that are remote from computational instance 802 (e.g., connected to computational instance 802 by one or more network links), including those within remote network management platform 320. In some cases, third-party system 800 may be on a public cloud network.

Also, the term "notification" refers to any type of event, log entry, metric, or message that provides information relating to the operation of third-party system 800 (or any software applications executing thereon). In the discussion below, the emphasis will be on events, but the embodiments herein are not limited to just events.

Notably, computational instance 802 may support a rich set of event management features and functions that facilitates the monitoring and administration of events generated by various sources. Notifications are often used to identify technical issues that a system is experiencing (e.g., too much load, not enough energy, a failure, and/or any sort of abnormal, unusual, or unexpected behavior). Doing so helps identify and resolve these issues proactively before they impact services and users.

This event management framework may define the following objects and procedures: event sources (systems, applications, or devices that generate events, such as monitoring tools, network devices, or server logs), event rules (define the conditions for evaluating events and triggering actions based on specific criteria), event processing (handling of incoming events, application event rules to determine their significance, and creation of alerts or incidents as necessary), and event visualization (dashboards, event lists, and event management workflows displayed on graphical user interfaces, providing real-time visibility into the health of various services).

At block 804, computational instance 802 is configured to facilitate definition of a third-party notification mapping and system communication parameters. This block is described in more detail below, but at a minimum defines how notifications from third-party system 800 are to be translated and stored. This may involve determining a mapping between a notification format in JSON or XML, for example, and a pre-defined database schema supported by computational instance 802.

At block 806, third-party device 800 is configured to be able to communicate with computational instance 802 as a destination for notifications. This step is optional if computational instance 802 is configured in pull mode.

To that point, there are at least two ways of configuring notifications to be transmitted from third-party device 800 to computational instance 802. In pull mode, computational instance 802 is configured with a network address (e.g., IP address or URL) and credentials (e.g., userid and password) of third-party device 800. Then, computational instance 802 periodically or from time to time remotely accesses third-party device 800 to obtain notifications. In push mode, computational instance 802 is configured to receive notifications from third-party device 800 at a specific network address (e.g., IP address and port number, or URL) and third-party device 800 is configured to automatically transmit notifications to this network address. The embodiments herein can operate either in push or pull mode.

At block 808, third-party device 800 generates one or more notifications. At block 810, third-party device 800 transmits these notifications to computational instance 802 (here, push mode is assumed).

At block 812, computational instance 802 translates these notifications in accordance with the mapping. At block 814, computational instance 802 stores the translated notifications in its database.

FIGS. 9A-9E provide example user interfaces that facilitate at least some of the aspects of block 804. Nonetheless, other user interfaces or techniques may be used to perform the operations of block 804.

Figure 9A:
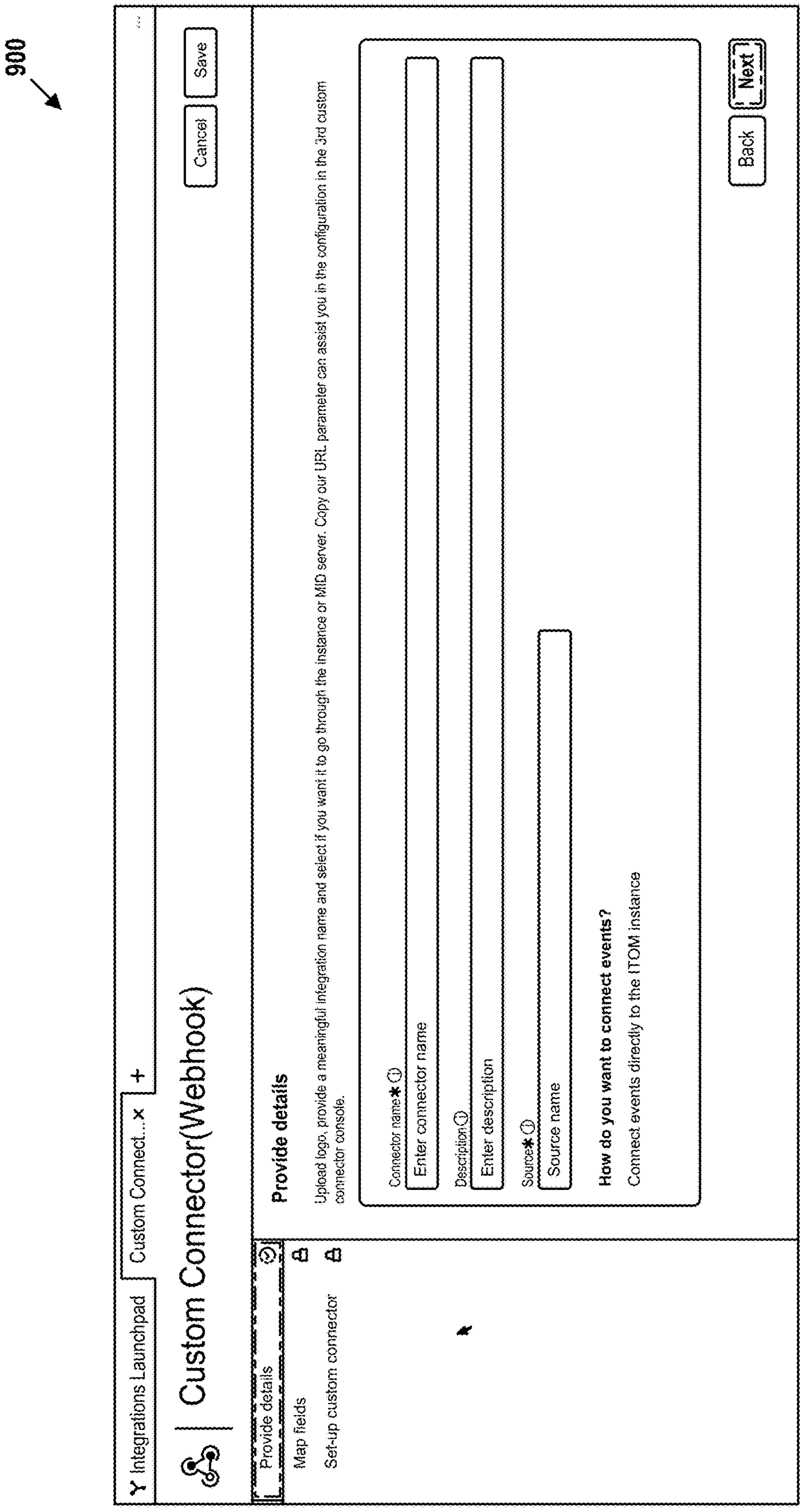
FIGS. 9A, 9B, 9C, 9D, 9E, and 9F depict graphical user interfaces, in accordance with example embodiments.

FIG. 9A depicts graphical user interface 900 for configuring a connector on a computational instance. This connector is a logical association between the computational instance and a third-party system so that the computational instance can receive notifications from the third-party system. As shown, graphical user interface 900 allows the specification of a connector name, an optional description, and a source for the connector. The source may be a network address of the third-party system.

Figure 9B:
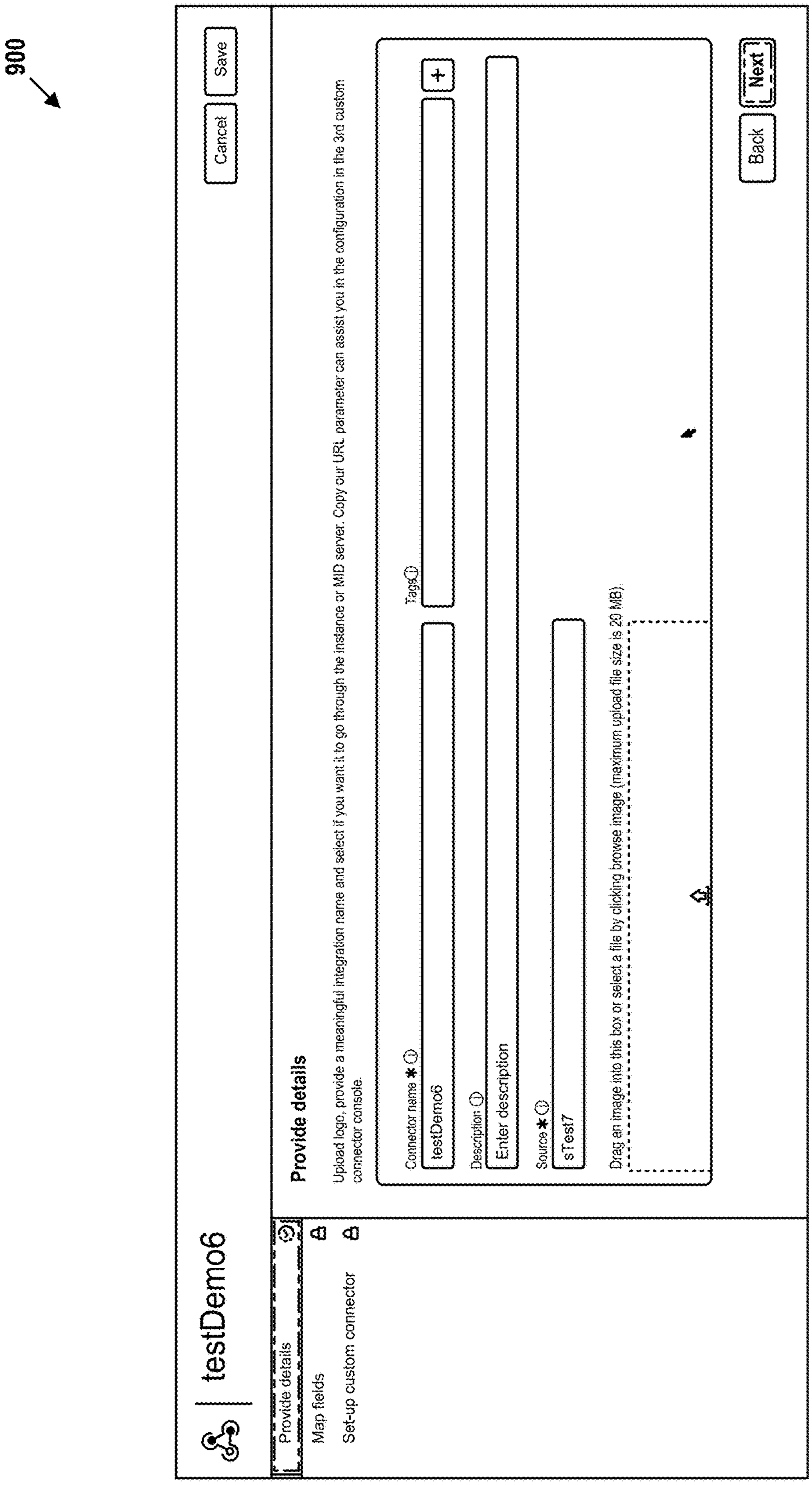

FIG. 9B depicts graphical user interface 900 with this information filled out. Notably, the connector name is "testDemo6" and the source is "sTest7". It is assumed that "sTest7" represents a preconfigured network address (e.g., an IP address or a URL). Alternatively, the network address may be explicitly specified as the source. Also, in FIG. 9B graphical user interface 900 allows the optional specification of one or more tags. These are text strings that are stored with notifications received via this connector. Such tags allow simple differentiation of notifications from various sources, e.g., for purposes of searching or filtering.

Figure 9C:
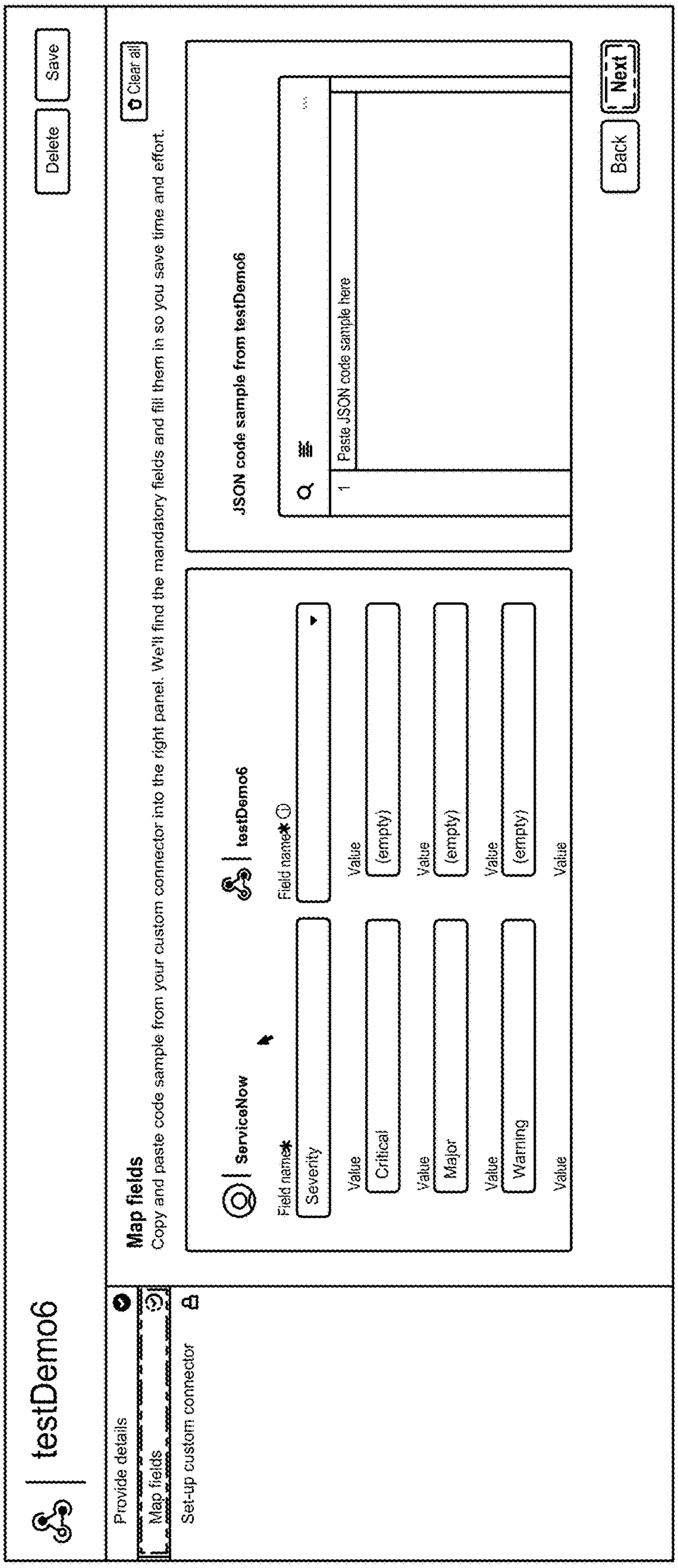

FIG. 9C depicts graphical user interface 902, which may follow graphical user interface 900 in a configuration workflow. This graphical user interface allows JSON code representing an example notification to be pasted in a text box on the right of the screen. Then, the computational instance may use this JSON to identify likely mappings between fields/paths therein and various parameters of the database schema in which notifications are stored. For example, objects in the JSON code sample with names that are identical, similar, or synonymous to that of the database schema of the computational instance may identified in proposed mappings. These proposed mappings could be overridden by the user to form actual mappings. In various implementations, the JSON code could be replaced by XML code or code in the some other structured format.

Figure 9D:
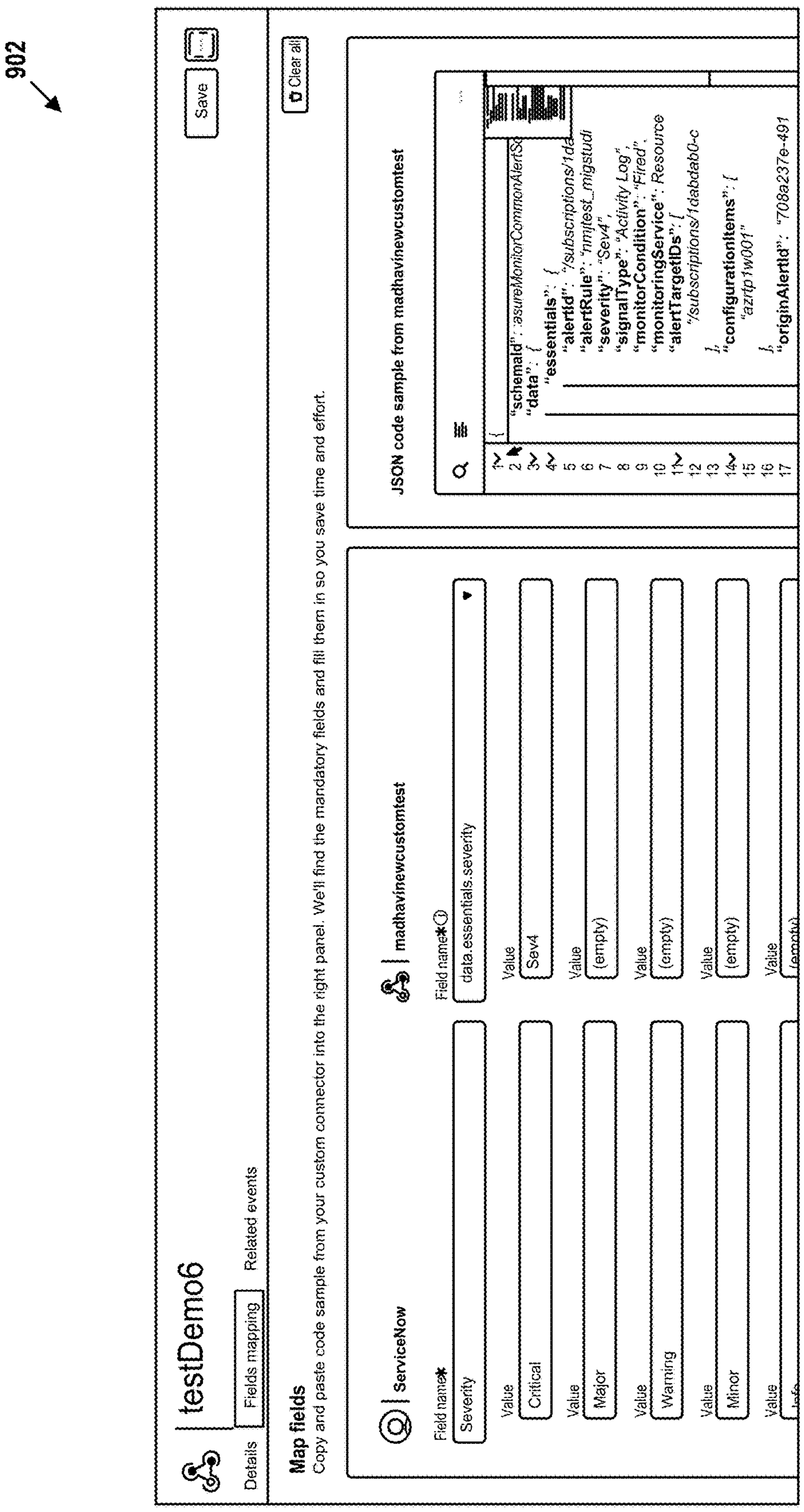

FIG. 9D depicts graphical user interface 902 with JSON code pasted into the text box and a mapping specified. Particularly, the path in the JSON code for "$.data.essentials.severity" has been mapped to the schema field "Severity", and the value in the JSON code of "Sev4" has been mapped to the schema value "Critical". As noted, a user has the ability to manually adjust these mappings.

The computational instance may generate a version of the mappings by parsing the JSON paths for certain keywords that are likely to map to particular schema fields and values. For example, for the schema field "Severity", may be associated with the keywords "severity", "importance", and "criticality", as well as possibly other synonyms for "severity" When the parser identifies one of these keywords in the JSON paths, it may automatically map this path to the schema field "Severity" as shown. This process may also take place for other schema fields and values.

In alternative or additional aspects of various implementation, a machine learning system may be trained on a corpus of JSON code files and their respective ground truth mappings to schema fields. Once trained, this system may be used as part of block 804 to predict mappings.

In further examples, instead of a user pasting the JSON code into a text box or providing the JSON code in some other way, the user may specify a URL at which the example JSON code can be found. Then, as part of block 804, the computational instance may automatically retrieve the example JSON code and determine the mappings to the schema fields and values.

Figure 9E:
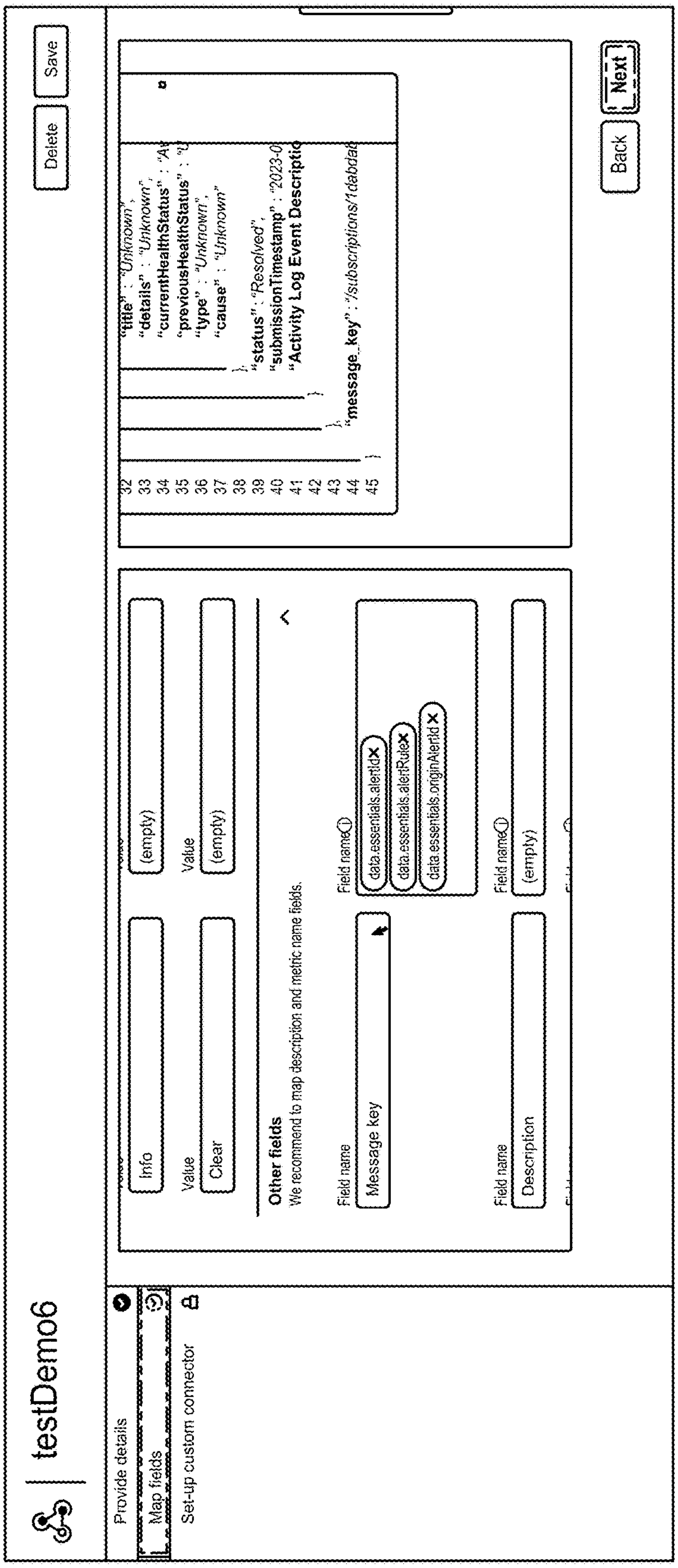

FIG. 9E depicts graphical user interface 902 displaying a mapping for a message key field for the connector. The message key may be a unique identifier to designate that multiple notifications or events relate to the same alert. In this context, an alert is triggered by a set of notifications or events determined to be of particular importance. The alert may be transmitted to or otherwise brought to the attention of an administrator or another alert recipient. In the example shown in FIG. 9E, the message key is mapped to a combination of the JSON paths "$.data.essentials.alertId", "$.data-.essentials.alertRule", and "$.data.essentials.originAlertId". Other possibilities exist.

Notably, the association of notifications with alerts may specify what type of alert (if any) is generated based on an incoming notification, how often the alert is transmitted, and to where the alert is transmitted. As an example, notifications matching a particular filter expression may cause the generation of an alert that is sent via text message to a group of administrators. The generation of alerts may be throttled so that no more than one every five minutes is generated no matter the number of matching notifications that have arrived during those five minutes. The filter expression may be a Boolean or regular expression including values and/or ranges of values for fields of the notification.

Figure 9F:
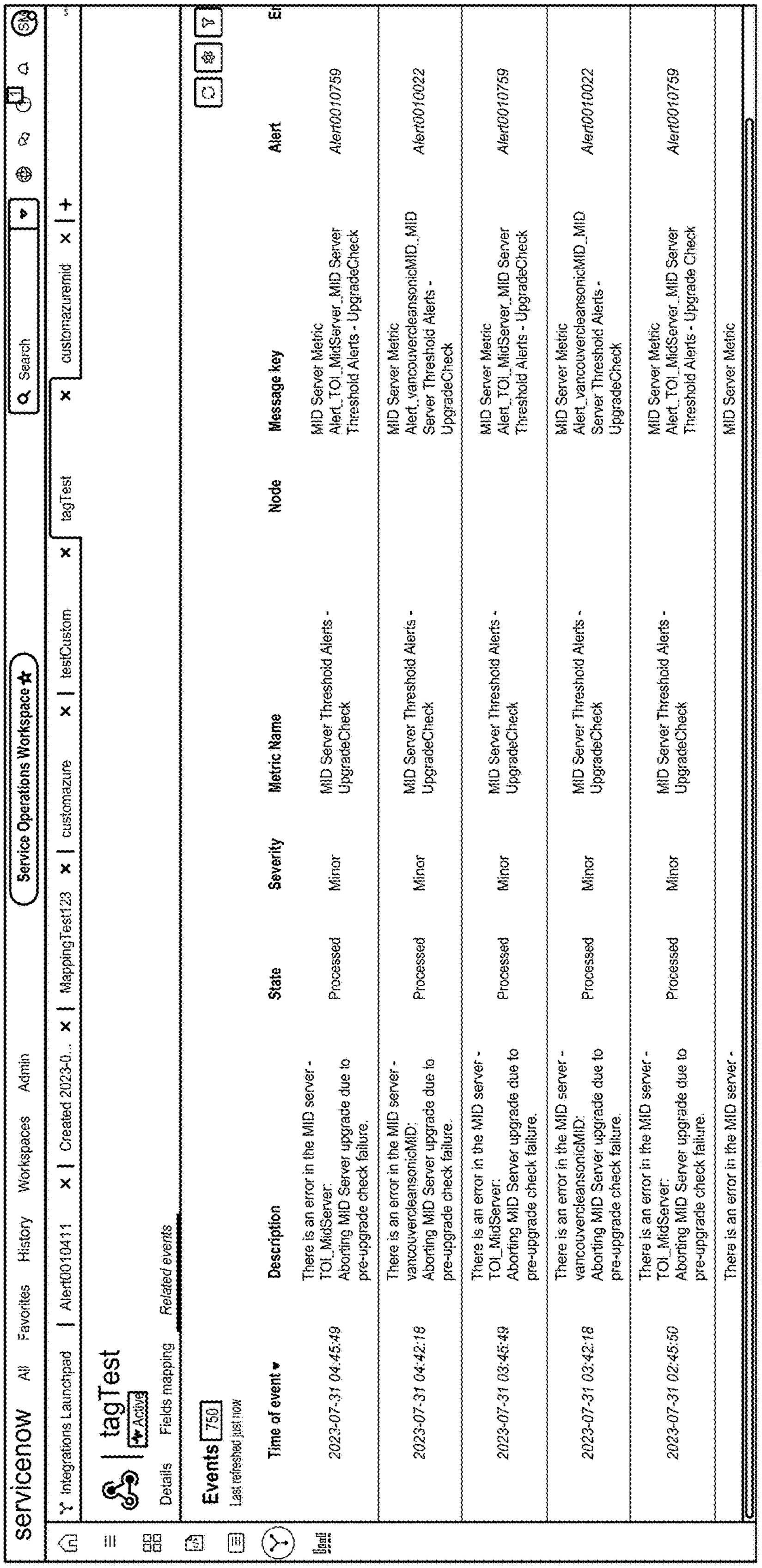

FIG. 9F depicts graphical user interface 910 displaying a list of events mapped as described above. As noted, an event may be considered a type of notification. Each event is characterized by the time that it occurred ("time of event"), a description of the event ("description"), its state ("state"), e.g., ready, processed, error, or transferred, its severity ("severity"), e.g., warning, minor, major, critical, the name of the metric whose measurement caused the event ("metric name"), network address associated with the event ("node"), its message key ("message key"), and an associated alert number ("alert"). More or fewer characterizations may be stored and/or displayed for events, and different values of these characterizations may be possible. In some cases, one or more characterizations may be blank or otherwise left undefined (e.g., the node characterization in FIG. 9F). Graphical user interface 910 establishes that mapped notifications can be stored, displayed, and manipulated in various ways.

IX. Example Operations

Figure 10:
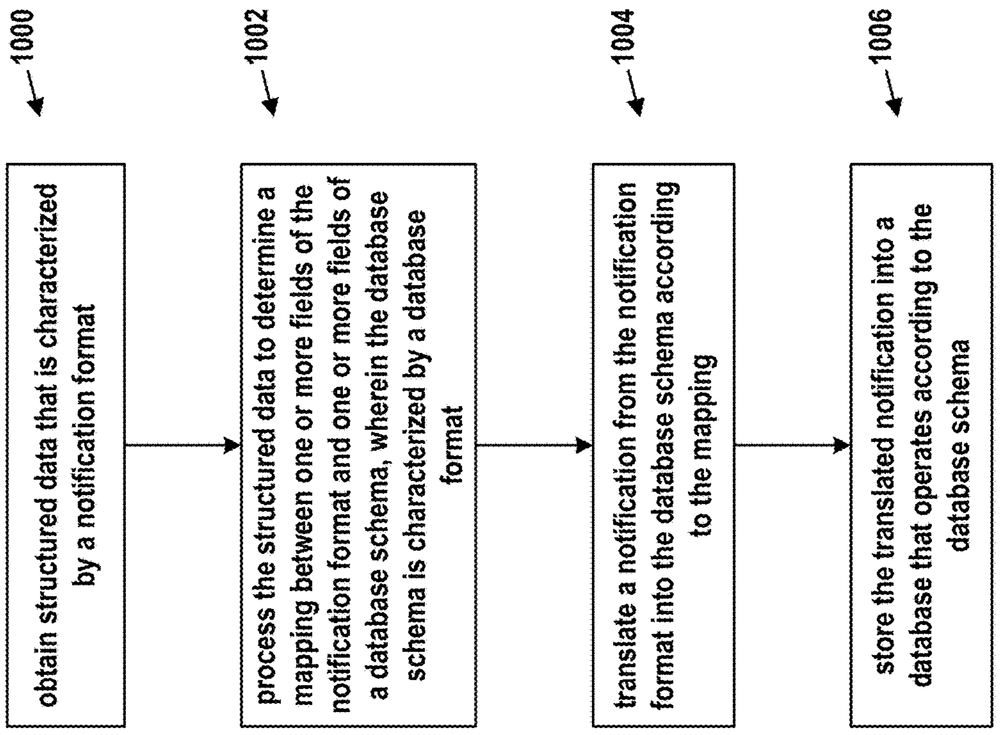
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve obtaining structured data that is characterized by a notification format. Block 1002 may involve processing the structured data to determine a mapping between one or more fields of the notification format and one or more fields of a database schema, wherein the database schema is characterized by a database format. Block 1004 may involve translating a notification from the notification format into the database schema according to the mapping. Block 1006 may involve storing the translated notification into a database that operates according to the database schema.

These embodiments provide a technical solution to a technical problem. This technical solution exhibits numerous advantages. Particularly, notifications from various sources can be transformed into a common format or structure, ensuring consistency and compatibility for subsequent processing. Also, notifications can be augmented with additional contextual information from external sources or internal databases (e.g., tags), making them more valuable for event analysis and correlation. Further, the automated mappings can be generated quickly and accurately. Additionally, usage of computing resources (e.g., processing, memory, and/or network bandwidth) is reduced due to users having to navigate unnecessarily through a large number of web pages and/or application pages before being able to find the information needed.

In some embodiments, the notification format is associated with a notification source, and wherein the notification was transmitted by the notification source.

In some embodiments, the notification was requested and retrieved from the notification source.

In some embodiments, the notification was received from the notification source at a predefined endpoint specified by a uniform resource locator.

In some embodiments, the structured data was inserted into a text box of a user interface.

In some embodiments, the structured data was retrieved from a predefined endpoint specified by a uniform resource locator.

In some embodiments, the notification format is in JSON or XML.

In some embodiments, the notification format is a nested set of fields in a tree-like structure.

Some embodiments may further involve displaying a representation of the mapping on a user interface.

In some embodiments, the representation of the mapping is adjustable via the user interface.

In some embodiments, translating the notification from the notification format into the database schema according to the mapping comprises associating the notification as represented in the database schema with one or more textual tags.

In some embodiments, processing the structured data to determine the mapping between the one or more fields of the notification format and the one or more fields of the database schema comprises determining the mapping based on textual tokens of the structured data and the database schema that are identical, synonymous, or similar.

In some embodiments, processing the structured data to determine the mapping between the one or more fields of the notification format and the one or more fields of the database schema comprises further comprises determining the mapping also based on named fields of the notification format and named elements of the database schema.

In some embodiments, processing the structured data to determine the mapping between the one or more fields of the notification format and the one or more fields of the database schema comprises determining the mapping based on application of a trained machine learning model to the structured data, wherein the trained machine learning model was trained to produce mappings to database schemas for structured data inputs.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

identifying a notification source in a graphical user interface (GUI);

providing, to the GUI, a sample notification format of the notification source, wherein the notification source is characterized by the sample notification format;

determining a mapping between one or more fields of the sample notification format and one or more fields of a database schema, wherein the mapping indicates an alert type to generate based on incoming notifications, how often alerts are transmitted, and to where alerts are transmitted;

storing the mapping;

translating an incoming notification into the database schema according to the mapping;

storing the incoming notification into a database that operates according to the database schema;

displaying a representation of the mapping on the GUI; and updating the representation of the mapping based on an input to the GUI.

2. The method of claim 1, wherein the incoming notification was requested and retrieved from the notification source.

3. The method of claim 1, wherein the incoming notification was received from the notification source at a predefined endpoint specified by a uniform resource locator.

4. The method of claim 1, wherein the sample notification format was inserted into a text box of the GUI.

5. The method of claim 1, wherein the sample notification format was retrieved from a predefined endpoint specified by a uniform resource locator.

6. The method of claim 1, wherein the sample notification format is in JavaScript Object Notation (JSON) or extensible Markup Language (XML).

7. The method of claim 1, wherein the sample notification format is a nested set of fields in a tree-like structure.

8. The method of claim 1, wherein translating the incoming notification from the sample notification format into the database schema according to the mapping comprises associating the incoming notification as represented in the database schema with one or more pre-defined textual tags.

9. The method of claim 1, wherein determining the mapping between the one or more fields of the sample notification format and the one or more fields of the database schema comprises determining the mapping based on textual tokens of the sample notification format and the database schema that are identical, synonymous, or similar.

10. The method of claim 9, wherein determining the mapping between the one or more fields of the sample notification format and the one or more fields of the database schema further comprises determining the mapping also based on named fields of the sample notification format and named elements of the database schema.

11. The method of claim 1, wherein determining the mapping between the one or more fields of the sample notification format and the one or more fields of the database schema comprises determining the mapping based on application of a trained machine learning model to the sample notification format, wherein the trained machine learning model was trained to produce mappings to database schemas for sample notification format inputs.

12. A non-transitory computer-readable medium, having stored thereon program instructions that, upon execution by a computing system, cause the computing system to perform operations comprising:

identifying a notification source in a graphical user interface (GUI);

providing, to the GUI, a sample notification format of the notification source, wherein the notification source is characterized by the sample notification format, and wherein the sample notification format is inserted into a text box of the GUI;

determining a mapping between one or more fields of the sample notification format and one or more fields of a database schema, wherein the mapping indicates an alert type to generate based on incoming notifications, how often alerts are transmitted, and to where alerts are transmitted;

storing the mapping;

translating an incoming notification into the database schema according to the mapping; and storing the incoming notification into a database that operates according to the database schema.

13. The non-transitory computer-readable medium of claim 12, wherein the sample notification format was retrieved from a predefined endpoint specified by a uniform resource locator.

14. The non-transitory computer-readable medium of claim 12, wherein determining the mapping between the one or more fields of the sample notification format and the one or more fields of the database schema comprises determining the mapping based on textual tokens of the sample notification format and the database schema that are identical, synonymous, or similar.

15. The non-transitory computer-readable medium of claim 12, wherein determining the mapping between the one or more fields of the sample notification format and the one or more fields of the database schema comprises determining the mapping based on application of a trained machine learning model to the sample notification format, wherein the trained machine learning model was trained to produce mappings to database schemas for sample notification format inputs.

16. A system comprising:

one or more processors; and memory, containing program instructions that, upon execution by the one or more processors, cause the system to perform operations comprising:

identifying a notification source in a graphical user interface (GUI);

providing, to the GUI, a sample notification format of the notification source, wherein the notification source is characterized by the sample notification format, and wherein the sample notification format is inserted into a text box of the GUI;

determining a mapping between one or more fields of the sample notification format and one or more fields of a database schema, wherein the mapping indicates an alert type to generate based on incoming notifications, how often alerts are transmitted, and to where alerts are transmitted;

storing the mapping;

translating an incoming notification into the database schema according to the mapping; and storing the incoming notification into a database that operates according to the database schema.

17. The method of claim 1, further comprising:

based on the incoming notification, generating an alert in accordance with the mapping.

18. The system of claim 16, wherein determining the mapping between the one or more fields of the sample notification format and the one or more fields of the database schema comprises determining the mapping based on textual tokens of the sample notification format and the database schema that are identical, synonymous, or similar.

19. The system of claim 16, wherein determining the mapping between the one or more fields of the sample notification format and the one or more fields of the database schema comprises determining the mapping based on application of a trained machine learning model to the sample notification format, wherein the trained machine learning model was trained to produce mappings to database schemas for sample notification format inputs.

20. The system of claim 16, wherein the operations further comprise:

displaying a representation of the mapping on the GUI, wherein the representation of the mapping is adjustable via the GUI.

* * * * *